Feb. 8, 1955 J. K. HAMILTON 2,701,578
PRECISION GAS PRESSURE REGULATOR
Filed Oct. 30, 1948 2 Sheets-Sheet 1
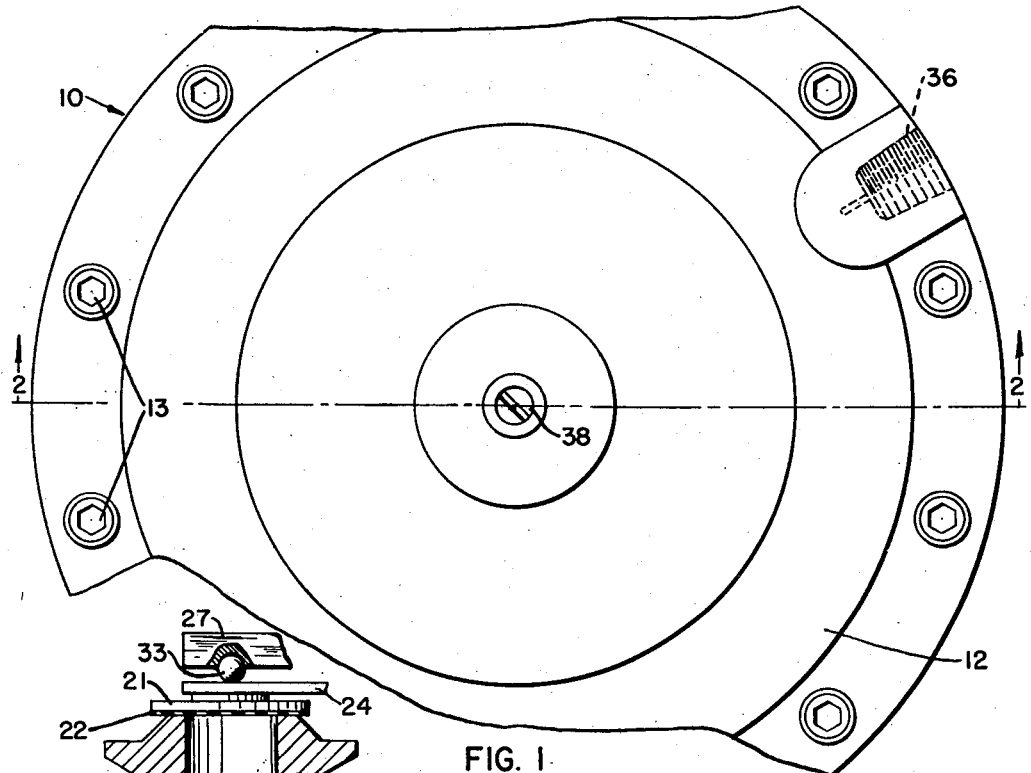
FIG. 1
FIG. 3
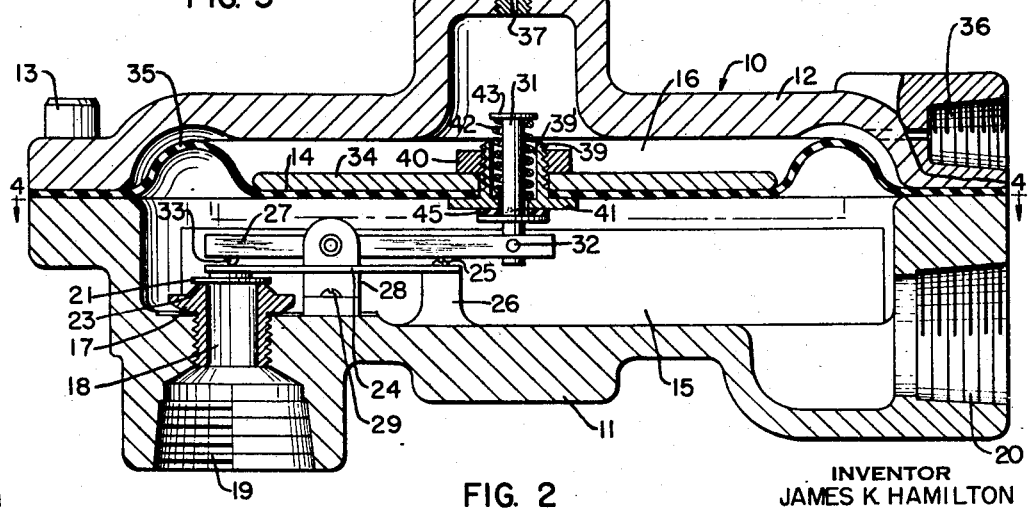
FIG. 2
INVENTOR
JAMES K. HAMILTON
BY
ATTORNEYS

INVENTOR
JAMES K. HAMILTON

United States Patent Office 2,701,578
Patented Feb. 8, 1955

2,701,578

PRECISION GAS PRESSURE REGULATOR

James K. Hamilton, Plainfield, N. J., assignor to Air Reduction Company, Incorporated, a corporation of New York Application October 30, 1948, Serial No. 57,574

4 Claims. (Cl. 137—116.5)

This invention relates to gas pressure regulators.

It has become increasingly important in recent years, with the introduction of new and improved methods of gas welding, cutting, scarfing, descaling, etc., to control and regulate the pressures and flows of the gases used in such methods with greater accuracy. This is especially true when two or more gases are to be mixed in exact proportions as in various methods involving the use of an oxy-fuel gas mixture. There is consequently a demand for a regulator that will regulate gas pressure in a very precise manner. Such a regulator should, of course, have a substantially constant delivery pressure. This means not only that the regulator should be so designed that the delivery pressure is not materially affected by variations in the pressure of the gas supplied to the regulator and by variations in the demand rate of the regulated gas but also that the regulator be designed so that any variations in the various forces that act in opposition to the diaphragm movement and that may affect the delivery pressure be reduced to a minimum or entirely eliminated. The regulator should therefore have loading means for the diaphragm that exerts a substantially constant force on the diaphragm in all positions of the diaphragm and should not depend upon the use of a spring to load the diaphragm because the force exerted by a loading spring varies as the position of the diaphragm changes, and the regulator should also have a diaphragm of such a type that its own resistance to movement remains substantially constant throughout its displacement range. To assist in producing and retaining its substantially constant delivery pressure the regulator should further have a valve element faced with a relatively soft, yielding, and elastic material like rubber that is capable of effecting a thoroughly gas-tight seal with the lip of the valve seat when the valve element is moved to closed position, and should have guiding means for the valve element that operates in a substantially frictionless way, and independently of the usual pivoted lever by which the valve element is operated from the diaphragm, to guide the valve element during its movement so that the valve facing will always make contact with the seat lip at the same place to avoid the formation of multiple lip impressions in the valve facing. A valve element so constructed and operated necessitates the use in the regulator of a pressure relief valve that prevents the accidental or unintentional building up of a gas pressure in the regulator that might seat the valve element with such force as to injure its relatively soft facing or injure other parts of the regulator that may be susceptible to this kind of injury by reason of their special design for precision regulation. Finally, it is important that the regulator have a diaphragm whose effective area does not materially change when it moves to its different positions.

So far as I am aware there is available no gas pressure regulator in which all of these features are combined to produce a regulator that will regulate gas pressure with great precision regardless of the demand rate, and it is the principal object of this invention to provide such a regulator.

It is a further object of the invention to provide a complete system for precisely regulating the pressure of one or more gases and of which the precision regulator of the invention may advantageously form a part.

A pressure regulator constructed in accordance with the invention, and the pressure regulating system, are both illustrated in the accompanying drawings, in which:

Figure 1 is a broken plan view of the regulator;

Fig. 2 is a vertical section taken along line 2—2 of Fig. 1;

Fig. 3 is an enlarged vertical section of the valve element and the valve seat;

Figure 4:
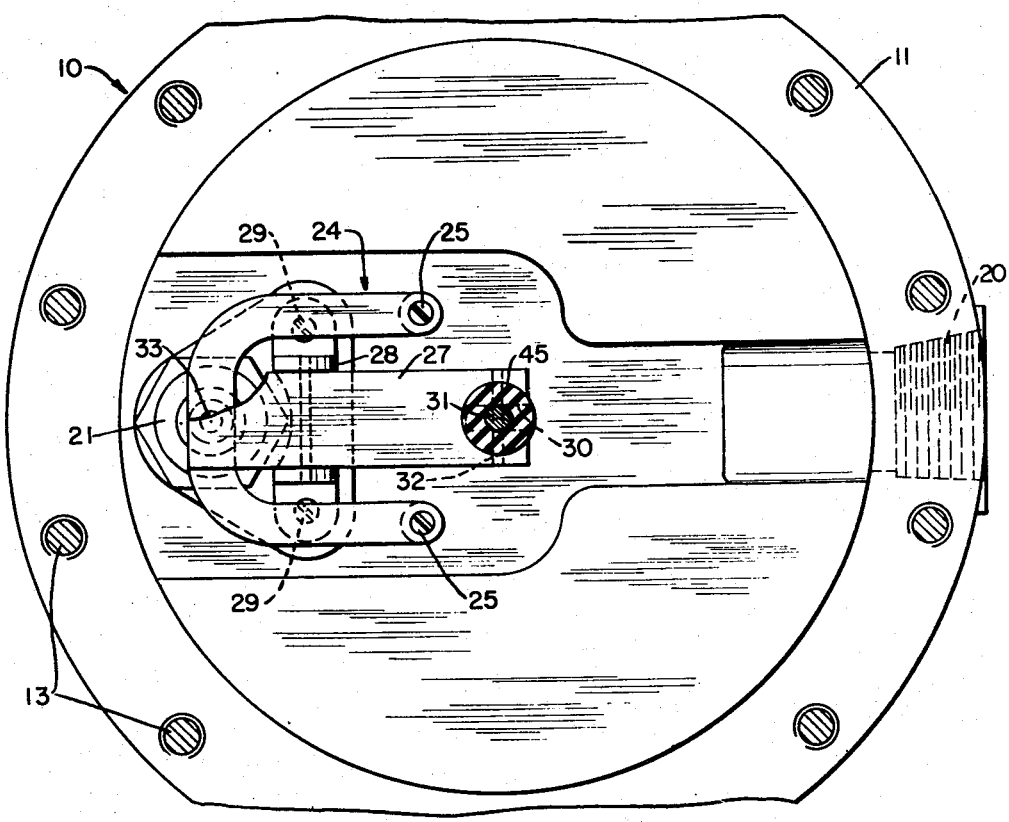
Fig. 4 is a horizontal section taken along line 4—4 of Fig. 2.

The regulator is denoted in general in the drawings by the numeral 10. It has a casing comprising a main body portion 11 (Fig. 2) and an upper section or bonnet 12 which is secured to the body portion by bolts 13. As shown in Fig. 1 the regulator casing is circular in shape when viewed from above. A diaphragm 14, preferably made of rubber or rubber composition, is clamped at its periphery between the two portions of the casing by the bolts 13 in the usual manner. The main body portion 11 of the casing is shaped to provide a reduced pressure chamber 15 below the diaphragm, and the upper section of the casing is shaped to provide a diaphragm-loading chamber 16 above the diaphragm.

A nozzle 17 is threaded into the body portion 11 of the casing from the interior of the chamber therein and communicates through a central passage 18 with an internally threaded recess 19 which constitutes the inlet connection of the regulator. The high-pressure source of the gas which is to be reduced in pressure and regulated by the regulator is connected by a suitable pipe to this inlet connection. The gas passes through the nozzle passage 18 and into the reduced pressure chamber 15. The body portion 11 of the casing has another threaded recess 20 communicating with the reduced pressure chamber 15 constituting an outlet connection to which a low-pressure discharge line may be connected for delivering the regulated gas to the place of consumption.

The flow of the gas through the nozzle passage 18 is controlled by a valve element 21 having at its underside a facing 22 (Fig. 3) of some relatively soft, yielding, and elastic material such as rubber. An annular lip 23 at the upper end of the nozzle 17 constitutes a valve seat with which the facing side of the valve element cooperates. The valve element is secured to and carried solely by a strip 24 of thin-gauge spring metal. As shown in Fig. 4 the metal strip 24 is preferably U-shaped, the ends of the two arms of the strip being screwed at 25 to bosses 26 (Fig. 2) on the regulator casing, and the valve element 21 being carried by the portion of the strip that connects the two arms. The spring strip 24 may have a slight biasing action on the valve element in either direction but the pressure of the incoming gas is relied upon to open the valve element, and a pivoted valve lever 27 (Fig. 2) is employed to move it toward its seat and to hold it at various distances from the nozzle lip 23. This lever is pivotally supported, preferably intermediate its ends, by a bracket 28 secured to the floor of the reduced pressure chamber 15 by screws 29. One end of the lever 27 is provided with a slot 30 (Fig. 4) which receives the lower end of a diaphragm stem 31 (Fig. 2) that is pivotally connected to the lever by a pin 32. A small ball 33 retained in a recess in the other end of the lever by peening over the edges of the recess is arranged to bear against the portion of the spring strip 24 that carries the valve seat. The stem 31, connected to the diaphragm 14 in the manner hereinafter described, transmits the diaphragm movements to the lever 27 so that the ball 33 either seats the valve element or holds it at some distance from the nozzle lip 23 against the pressure of the incoming gas depending upon the position of the diaphragm.

The center portion of the diaphragm 14 is reinforced over the greater part of its area by a circular backing plate 34 (Fig. 2) made of some light material such as aluminum. The diaphragm has an annular relief or corrugation 35 lying between the peripheral edge of the plate 34 and the casing.

The bonnet 12 of the regulator casing has a threaded recess 36 (Fig. 2) communicating with the diaphragm-loading chamber 16 and which constitutes an inlet connection by which a high-pressure source of a diaphragm-loading gas can be connected to the regulator. The loading gas is preferably an inert gas such as nitrogen, helium, or the like, and is admitted to the diaphragm-loading chamber 16 after its pressure has been suitably reduced and regulated by a pilot regulator as hereinafter described. The loading gas is maintained almost statically in the diaphragm-loading chamber 16 but is caused to flow at a very small rate through a restricted outlet passage 37 in the top of the bonnet 12. The rate at which the loading gas is permitted to flow through the passage 37 may be adjusted by a needle valve 38. The inert gas admitted to the diaphragm-loading chamber 16 serves to load the diaphragm in place in the usual loading spring.

The backing plate 34 and the diaphragm are clamped together at their centers by a threaded stud 39 which extends through openings in the diaphragm and the plate, and by a nut 40 which when screwed on the threaded portion of the stud clamps the plate and diaphragm between the nut and a head portion 41 on the stud. The previously described diaphragm stem 31 passes loosely through a hole in the head portion of the stud and extends upwardly through and in coaxial relation with a recess 39' in the stud having an internal diameter larger than the diameter of the diaphragm stem. This recess accommodates a coil spring 42 which surrounds the diaphragm stem and reacts at its upper end against a head 43 on the diaphragm stem and at its lower end against the bottom of the recess in the stud. The spring biases the diaphragm stem upwardly and yieldingly presses a shoulder 44 on the stem against a gasket 45 positioned between the shoulder and the head 41 of the stud. Normally the spring 42 compresses the gasket sufficiently to create a gas-tight seal around the stem 31. Downward movements of the diaphragm are imparted to the stem 31 directly through the head 41 of the stud, the gasket 45, and the shoulder 44 on the stem, and normal upward movements of the diaphragm are imparted to the stem through the spring 42 without compressing the spring and breaking the gas-tight seal around the stem. However, if an excessive pressure occurs in the reduced pressure chamber 15 the parts just described serve as a relief valve to permit the flow of gas from the reduced pressure chamber into the diaphragm-loading chamber 16 and thereby relieve the excessive pressure. The excessive pressure in moving the diaphragm upwardly beyond the position at which the valve element is firmly seated will cause the head 41 of the stud 39 to move away from the shoulder 44 on the stem 31 thereby permitting gas to escape past the gasket 45 and pass upwardly into the diaphragm-loading chamber around the stem. The excessive pressure in the reduced pressure chamber might be caused, for instance, by a slow leakage of gas past the valve element when it is in its closed position thereby building up the excessive pressure which should be relieved, or by an increase in back pressure resulting from improper functioning of some equipment downstream from the regulator. The principal advantage of locating the relief valve in the diaphragm instead of in the regulator casing is that it then operates in response to the difference in pressures in the reduced pressure chamber 15 and the diaphragm-loading chamber and may therefore vent at any set delivery pressure so long as the differential pressure across the diaphragm is greater than the maximum permissible differential. A relief valve located in the regulator casing can operate only at a predetermined set delivery pressure which must be greater than the maximum delivery pressure. Another advantage of locating the relief valve in the diaphragm is that it then discharges the gas into the diaphragm-loading chamber where it is mixed with and diluted by the inert gas therein before it is discharged to the atmosphere, thus making the gas more innocuous and less dangerous than if discharged directly into the atmosphere in an undiluted condition.

The regulator functions in the usual way to reduce the pressure of the incoming gas and deliver the gas at a substantially constant reduced pressure through the regulator outlet. In the original position of the diaphragm before gas pressure is exerted on its under side, the diaphragm is pressed downwardly by the pressure of the loading gas in the loading chamber 16 thereby permitting the valve element 21 to open. The gas thus admitted to the chamber 15 forces the diaphragm upwardly, and if the flow of gas is cut off downstream from the regulator the pressure will build up in the chamber 15 and continue to displace the diaphragm upwardly until the lever 27 forces the valve element against its seat and stops the flow of gas into the chamber 15. When gas is being used downstream from the regulator the diaphragm will always move to a position in which the valve element is open such an amount that the gas delivered to the chamber 15 produces a pressure therein which exerts a force against the lower face of the diaphragm that balances the downward force of the loading gas in the loading chamber 16. The gas flows out of the outlet 20 at this pressure, which is the delivery pressure of the regulator. It is evident that the delivery pressure of the regulator can be varied by varying the pressure maintained in the chamber 16 by the loading gas.

The use of a gas for loading the diaphragm in place of a spring makes it possible to employ a relatively large diaphragm and this is advantageous because it increases the sensitivity of the regulator and facilitates attaining the object of precise regulation by the regulator. If a spring were employed to load the diaphragm, the larger diaphragm would require a correspondingly larger spring and this would make precise regulation that much more difficult. When the diaphragm is loaded by a gas supplied under constant pressure and the loading gas is permitted to escape slowly from the loading chamber as above described, the loading gas exerts a pressure on the diaphragm that is substantially constant at all times because the displacement of the diaphragm by the regulated gas does not materially compress the gas in the loading chamber and this is true even when a relatively large diaphragm is employed. Thus the employment of gas loading instead of spring loading for the diaphragm substantially eliminates variations in the loading force acting on the diaphragm, these variations being of greater magnitude as the size of the diaphragm increases. As stated in the introductory portion of the specification the diaphragm should be of such a type that its own resistance to movement remains substantially constant, and its effective area remains substantially constant throughout its displacement range. These things are attained by the diaphragm backing plate 34 in combination with the annular relief or corrugation 35 on the diaphragm.

The spring strip 24 supports and guides the valve element 21 in a frictionless manner and entirely independently of the valve lever 27. This is important. If the valve element were secured to the lever 27 it would be necessary, in order to guide the valve element accurately enough to cause the valve facing to contact with the seat lip always at exactly the same place, to brace the valve lever 27 during its movement quite firmly against lateral movement as well as longitudinal movement and this would increase the resistance to movement of the valve lever whereas the resistance in its pivotal mounting and in its pivotal connection to the diaphragm stem should be reduced to a minimum. The spring strip 24 restrains lateral movement of the valve element in all directions and guides it so that the valve facing always makes contact with the seat lip at exactly the same place, thereby avoiding multiple lip impressions in the facing. The guiding of the valve element by the spring strip is accomplished without producing any material resistance to the movement of the valve element.

The prevention of an excessive pressure in the reduced pressure chamber by the relief valve avoids rupturing of the diaphragm which might otherwise result from the excessive pressure and also avoids damage to the valve facing by a too forceful seating of the valve element which might otherwise be caused by the excessive pressure. The larger the diaphragm the greater will be the danger of the valve facing and the diaphragm being damaged by the excessive pressure and therefore the provision of a relief valve is of particular importance when the regulator has a relatively large diaphragm. The relief valve also, of course, avoids injury to other operating parts of the regulator which might otherwise be caused by the excessive pressure in the reduced pressure chamber.

All of the above features in combination cooperate to produce an improved pressure regulator which is capable of precision regulation. Tests have shown that delivery pressures of the regulator may be maintained constant within 0.015 p. s. i. even with repeated "on-off" operation and regardless of normal changes in the supply pressure or rate of outflow. This is of special significance when two gases such as oxygen and a fuel-gas are mixed in some particular ratio, since by the use of the regulator herein described the ratio of such gases can be held constant to within ½ of 1 per cent. Pressure regulators of a similar type heretofore available were capable of holding a ratio of such gases to within only 2 or 3 per cent under even the best of conditions.

Figure 5:
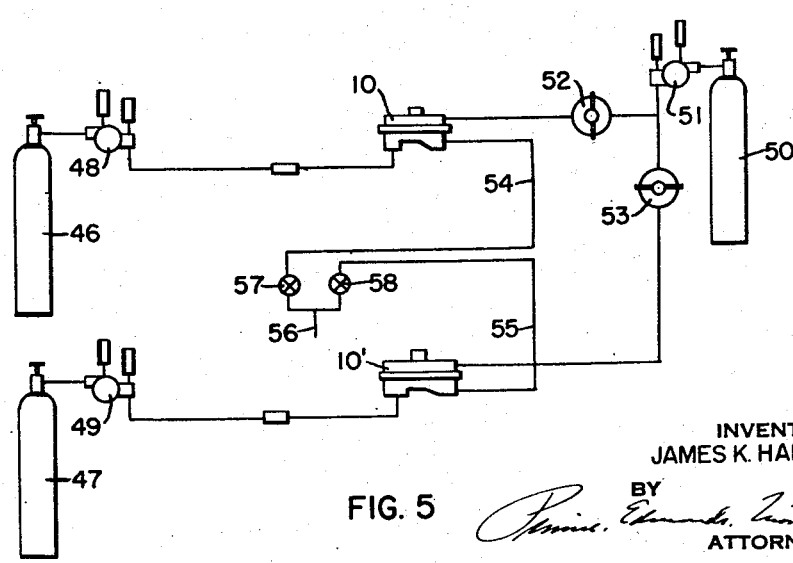
Fig. 5 is a schematic illustration of the improved pressure regulating system.

When using the regulator for precise regulation of a gas it is important, of course, that the diaphragm-loading gas be supplied to the diaphragm-loading chamber of the regulator at as constant a pressure as possible between the times when its pressure is purposely adjusted to change the delivery pressure of the regulator. The gas regulating system in which the regulator is used should therefore contain means for accomplishing this. Fig. 5 shows what is believed to be a novel pressure regulating system for precisely regulating the pressures of two gases that are to be subsequently mixed and that not only embodies the use of precision regulators of the kind above described but also means for accurately regulating the pressure of the diaphragm-loading gas supplied to each of the precision regulators. The two gases to be mixed, such as oxygen and acetylene, are supplied from two high-pressure sources of such gases such as the cylinders 46 and 47. Two main regulators 10 and 10' of the precision type above described are employed to regulate the pressures of the two gases, the inlet of the regulator 10 being connected to the cylinder 46 and the inlet of the regulator 10' being connected to the cylinder 47. Preferably the main regulator 10 is connected to the cylinder 46 through a conventional regulator 48 which is connected at its inlet side to the cylinder 46 and at its outlet side to the inlet of the main regulator 10, and the main regulator 10' is connected to the cylinder 47 through a conventional regulator 49 which is connected at its inlet side to the cylinder 47 and at its outlet side to the inlet of the main regulator 10'. The regulators 47 and 48 roughly regulate the two gases at their sources so as to narrow down the pressure variation range of each gas when supplied to the corresponding precision regulator 10 or 10'. A diaphragm-loading gas, for example, nitrogen, is supplied from a high-pressure source such as the cylinder 50. A conventional regulator 51 is connected at its inlet side to this cylinder and at its outlet side to the inlet side of each of two adjustable pilot regulators 52 and 53. The pilot regulator 52 is connected at its outlet side to the diaphragm-loading chamber of the precision regulator 10, and the outlet side of the pilot regulator 53 is connected to the diaphragm-loading chamber of the precision regulator 10'. Thus the diaphragm-loading gas is roughly regulated by the regulator 51, then flows in two branches through the pilot regulators 52 and 53 which more precisely regulate the loading gas delivered to the diaphragm-loading chambers of the two main or precision regulators. Conduits 54 and 55 lead from the outlet connections of the precision regulators 10 and 10' respectively to the place of consumption of the two regulated gases represented at 56. Valves indicated at 57 and 58 permit the gases to be mixed in the desired proportions and when the ratio in which the gases are mixed is once determined by the adjustment of these valves the ratio will be maintained practically constant by the precision regulating system. Of course, if only a single gas is to be precisely regulated for some purpose, instead of two gases to be subsequently mixed, the regulating system for that gas would include only those portions of the above-described system that are required for the regulation of the single gas.

I claim:

1. A gas pressure regulator comprising a casing having inlet and outlet connections, a diaphragm dividing the interior of the casing into two chambers at opposite sides of the diaphragm one of which is a reduced pressure chamber with which the inlet and the outlet communicate and the other of which is a diaphragm-loading chamber, a rigid plate connected centrally with the diaphragm and movable therewith, the portion of the diaphragm between the periphery of said plate and the wall of the casing having an annular corrugation, a valve element controlling the inlet and having a facing of elastic material cooperating with a lip-type seat surrounding the inlet opening, a pivoted valve-actuating lever operatively connected to the diaphragm, a spring strip fixedly held at one portion, the valve element being secured to such spring strip at a free portion of the spring strip and being carried solely by the spring strip whereby the spring strip guides the valve element independently of said valve-actuating lever, a portion of said lever being arranged to exert pressure on the valve element and seat it when the gas pressure in the reduced pressure chamber acting on the diaphragm increases to a predetermined value, and means isolated from the gas supplied to and passing through the regulator for admitting a diaphragm-loading gas to said diaphragm-loading chamber, the casing having a restricted vent opening through which the diaphragm-loading gas can slowly escape from the loading chamber.

2. A gas pressure regulator in accordance with claim 1 in which the spring strip that carries and guides the valve element is U-shaped, the ends of the two arms of the strip being secured to the regulator casing and the valve element being secured to the portion of the strip that connects the two arms.

3. A gas pressure regulator in accordance with claim 1 in which the operative connection between the valve-actuating lever and the diaphragm comprises a rod pivotally connected to the valve-actuating lever and passing loosely through an opening at the center of the diaphragm, a valve member carried by said rod at the same side of the diaphragm as the valve-actuating lever and adapted to close said opening at the center of the diaphragm, a coil spring reacting between the diaphragm and said rod and yieldingly urging the diaphragm and said valve member towards each other to normally prevent the passage of gas past the valve member and through said opening at the center of the diaphragm to the diaphragm-loading chamber but permitting the diaphragm to move away from said valve member at a predetermined pressure differential on opposite sides of the diaphragm to thereby allow the escape of gas from the reduced pressure chamber into the diaphragm-loading chamber.

4. A gas pressure regulator in accordance with claim 1 in which the valve element is secured to the spring strip at a point on the longitudinal axis thereof so as to be symmetrically disposed with respect to such axis and in which the portion of the valve-actuating lever that exerts pressure on the valve element carries a ball that makes substantially point contact with the spring strip along the longitudinal axis thereof and substantially at the point at which the valve element is secured thereto.

References Cited in the file of this patent

UNITED STATES PATENTS

| Re. 21,804 | Gorrie | May 20, 1941 |
|---|---|---|
| 417,136 | Bell | Dec. 10, 1889 |
| 1,181,010 | Hoyt | Apr. 25, 1916 |
| 1,234,726 | Bruckner | July 31, 1917 |
| 1,236,010 | Savage | Aug. 7, 1917 |
| 1,257,741 | Russell | Feb. 26, 1918 |
| 1,434,102 | Parade | Oct. 31, 1922 |
| 1,488,649 | Scheurich | Apr. 1, 1924 |
| 1,840,228 | Elfers | Jan. 5, 1932 |
| 1,879,940 | Mangiameli | Sept. 27, 1932 |
| 1,936,362 | Kennedy | Nov. 21, 1933 |
| 1,941,831 | Ford | Jan. 2, 1934 |
| 2,156,823 | Stettner | May 2, 1939 |
| 2,261,364 | Grove | Nov. 4, 1941 |
| 2,270,304 | Jacobsson | Jan. 20, 1942 |
| 2,306,746 | Niesemann | Dec. 29, 1942 |
| 2,333,775 | Gille | Nov. 9, 1943 |
| 2,402,280 | Green | June 18, 1946 |
| 2,411,986 | Cowherd | Dec. 3, 1946 |
| 2,519,333 | Annin | Aug. 22, 1950 |